(12) United States Patent
Thometschek et al.

(10) Patent No.: US 12,528,953 B2
(45) Date of Patent: Jan. 20, 2026

(54) COATED ARTICLE AND METHOD FOR COATING OF AN ARTICLE

(71) Applicant: Immologic BV, Sint Denijs (BE)

(72) Inventors: Marc Anton Charles Thometschek, Zandvoorde (BE); Michael Eckhard Rosanne Laperre, Sint Eloois Winkel (BE)

(73) Assignee: Immologic BV, Sint Denijs (BE)

( * ) Notice: Subject to any disclaimer, the term of this patent is extended or adjusted under 35 U.S.C. 154(b) by 999 days.

(21) Appl. No.: 17/295,141

(22) PCT Filed: Nov. 19, 2019

(86) PCT No.: PCT/EP2019/081766
§ 371 (c)(1),
(2) Date: May 19, 2021

(87) PCT Pub. No.: WO2020/104441
PCT Pub. Date: May 28, 2020

(65) Prior Publication Data
US 2022/0017759 A1 Jan. 20, 2022

(30) Foreign Application Priority Data
Nov. 19, 2018 (EP) .................................... 18206969

(51) Int. Cl.
*C09D 7/65* (2018.01)
*B29C 48/00* (2019.01)
(Continued)

(52) U.S. Cl.
CPC .............. *C09D 7/65* (2018.01); *B29C 48/022* (2019.02); *B29C 48/05* (2019.02); *B29C 48/154* (2019.02);
(Continued)

(58) Field of Classification Search
CPC .......... C09D 7/65; C09D 7/69; C09D 201/00; B29C 48/154; B29C 48/022; B29C 48/05;
(Continued)

(56) References Cited

U.S. PATENT DOCUMENTS

| 5,869,166 A | 2/1999 | Caldwell |
| 2011/0281978 A1 | 11/2011 | Desai et al. |
| 2015/0308056 A1* | 10/2015 | Spittle .................. D06N 7/0071 428/17 |

FOREIGN PATENT DOCUMENTS

| EP | 1323787 A2 | 7/2003 |
| EP | 1942174 A2 | 7/2008 |

(Continued)

OTHER PUBLICATIONS

Silva et al., "Cork: properties, capabilities and applications", International Materials Reviews, 2005, pp. 345-365, vol. 50:6.

*Primary Examiner* — Pegah Parvini
(74) *Attorney, Agent, or Firm* — The Webb Law Firm

(57) ABSTRACT

The invention describes an extrudable coating composition including a coating thermoplastic polymer and particles, wherein the particles are made from a particle material that has a modulus of compression from 0.1 to 100 MPa. The invention further describes a coating on at least a part of the surface of an article, the coating including a coating thermoplastic polymer and particles, wherein the particles are made from a particle material that has a modulus of compression from 0.1 to 100 MPa and that at least a part of the particles protrude from the surface of the coating. The invention also describes a coated article, in particular an imitation branch, a method of coating an article, and the use of particles made from a particle material with a compression modulus of 0.1 to 100 MPa in a coating composition for the coating of articles.

7 Claims, 2 Drawing Sheets

(51) Int. Cl.
  *B29C 48/05* (2019.01)
  *B29C 48/154* (2019.01)
  *B29K 301/12* (2006.01)
  *B29K 675/00* (2006.01)
  *B44C 5/06* (2006.01)
  *C08K 7/22* (2006.01)
  *C08L 97/00* (2006.01)
  *C09D 7/40* (2018.01)
  *C09D 201/00* (2006.01)

(52) U.S. Cl.
  CPC .................. *B44C 5/06* (2013.01); *C09D 7/69* (2018.01); *C09D 201/00* (2013.01); *B29K 2301/12* (2013.01); *B29K 2675/00* (2013.01); *B29K 2715/003* (2013.01); *B29K 2995/0072* (2013.01); *C08K 7/22* (2013.01); *C08L 97/007* (2013.01)

(58) Field of Classification Search
  CPC .. B44C 5/06; B29K 2301/12; B29K 2675/00; B29K 2715/003; B29K 2995/0072; C08K 7/22; C08L 97/007
  See application file for complete search history.

(56) References Cited

FOREIGN PATENT DOCUMENTS

| | | | |
|---|---|---|---|
| EP | 2301763 | A1 | 3/2011 |
| EP | 2402142 | A2 | 1/2012 |
| EP | 2682277 | A1 | 1/2014 |
| EP | 2871169 | A1 | 5/2015 |
| WO | 9915595 | A1 | 4/1999 |

* cited by examiner

COATED ARTICLE AND METHOD FOR COATING OF AN ARTICLE

CROSS-REFERENCE TO RELATED APPLICATIONS

This application is the United States national phase of International Application No. PCT/EP2019/081766 filed Nov. 19, 2019, and claims priority to European Patent Application No. 18206969.0 filed Nov. 19, 2018, the disclosures of which are hereby incorporated by reference in their entirety.

BACKGROUND OF THE INVENTION

Field of the Invention

The present invention relates to an extrudable coating composition, a coating, a coated article, an imitation branch, a method for coating an article, a coated article or imitation branch obtainable by that method, a wall panel and a use of particles in a coating composition.

Description of Related Art

Articles with decorative coatings are desired by customers. In particular, coatings that imitate a natural look are found to be aesthetically pleasing. Such coatings can be applied to different articles. For example, decorative walls, furniture and other structures with a decorative coating with a natural look are desired by customers. It is known to manufacture the aforementioned articles from natural materials. However, when using these structures from natural materials outdoors, they have the downsides of having relatively short life spans and being less robust than structures made from synthetic polymer materials.

A particular example for articles with decorative coatings used outdoors are decorative separation walls and fencing, which are often made from natural branches such as hazel. These structures have a pleasant appearance and are widely popular. However, they have relatively short life spans and are less robust than structures made from synthetic polymer materials.

Accordingly, for example for decorative separation walls, imitation branches made from synthetic polymer materials have been manufactured.

EP 2 682 277 and EP 2 301 763 describe imitation branches comprising a plastic strand wherein the plastic strand is locally provided with modifications to its surface structure over at least part of its outer surface, characterized in that said modifications are irregular. The preparation of such imitation branches requires a special cooling step requiring a moving cooling medium which reduces the efficiency of the production method.

EP 2 402 142 describes a method for forming imitation branches wherein a plastic strand is formed from a polymer mass comprising an expandable plastic and wherein the plastic strand is coextruded with a second mixture comprising at least a quantity of particles comprising vegetable fibers with at least a quantity of polymer in such way that a first layer, on the basis of the second mixture, is formed on the plastic strand. While coextrusion provides a tight bond between the coextruded polymer masses, the preparation method requires a coextrusion step in the presence of vegetable particles which means that the polymer used in the coextrusion must be carefully chosen so that they do not tear too easily when coextruded with vegetable particles inside. This applies in particular when the core of the imitation branch is foamed. The natural fibers described in EP 2 402 142 furthermore discolor relatively rapidly in the presence of UV-light.

Additionally, the above-described imitation branches do not exhibit the same rough surface that natural branches possess. The imitation branches described above may thus seem different from natural branches.

However, also for other articles varying from separation walls to table legs, such an aesthetically pleasing natural look and feel is desirable.

SUMMARY OF THE INVENTION

Therefore, an object of the present invention is to provide a coating composition that allows for the manufacturing of a coating that imitates a natural look.

Another object of the present invention is the provision of a coating and/or a coated article that has a rough surface, in particular a natural look and feel, and/or a long durability.

It is also an object of the invention to provide a coating and/or a coated article with aesthetic appeal.

Another object of the present invention is to provide an improved preparation method of coated articles with surface structures that have a rough surface, in particular that have a natural look and feel. Furthermore, the present invention has the object of providing a simple, rapid and cheap method of preparing coated articles with a rough surface, in particular of imitation branches.

BRIEF DESCRIPTION OF THE DRAWINGS

All of these objects are achieved with the extrudable coating composition as described herein.

DESCRIPTION OF THE INVENTION

Figure 1:
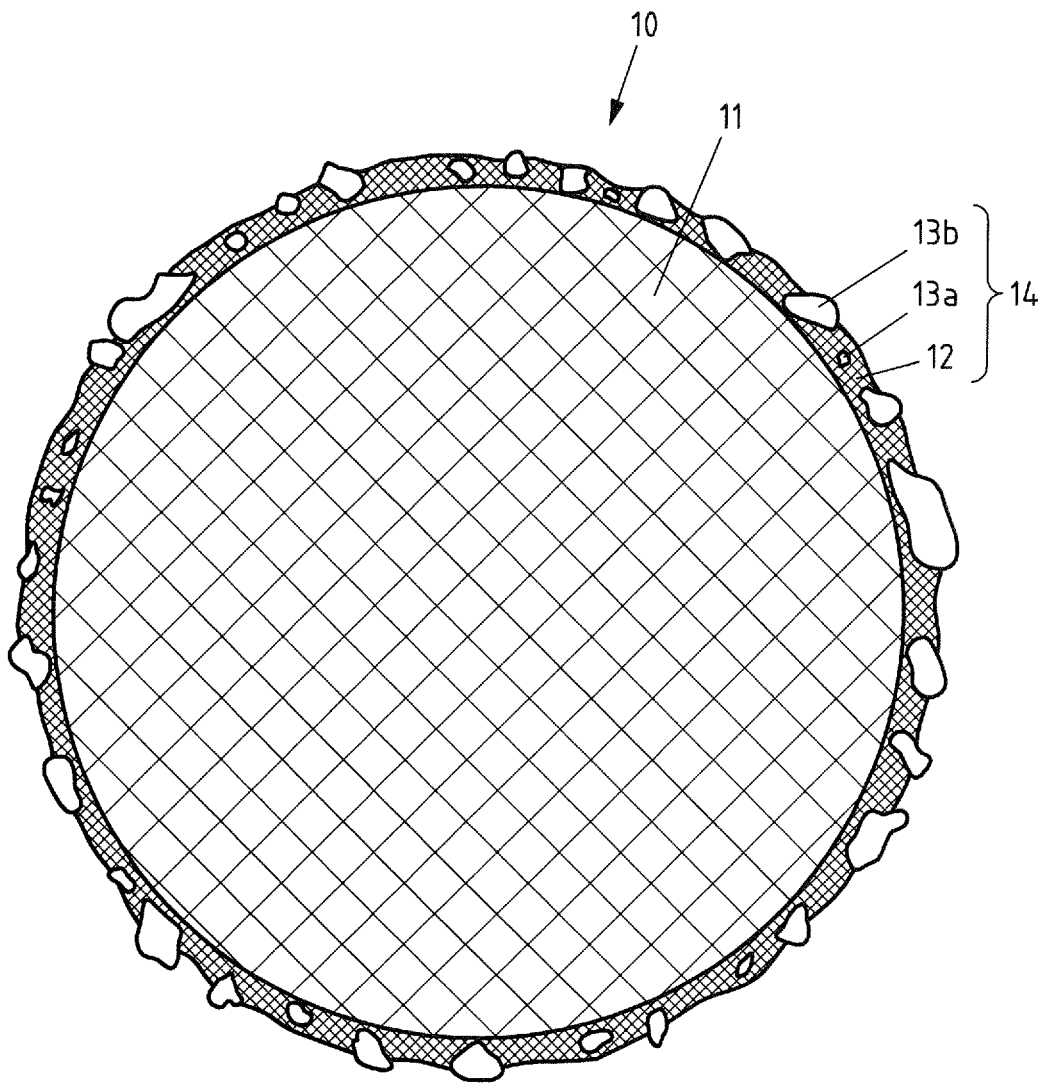
FIG. 1 shows a cross-section of an imitation branch as an example of a coated article.

Surprisingly, it has been found that an extrudable coating composition comprising a coating thermoplastic polymer and particles wherein the particles are made from a particle material that has a modulus of compression from about 0.1 to 100 MPa shows excellent properties when used for the coating of articles. Articles coated with such an extrudable coating composition, in particular imitation branches, show high durability, exhibit a rough surface, have a natural look and feel and possess a positive, aesthetic appeal. At the same time, articles coated with such an extrudable coating composition can be easily and cheaply produced.

Without being bound to any particular scientific theory, it is believed that the particles made from particle material that has a modulus of compression from about 0.1 to 100 MPa in the extrudable coating composition are responsible for the excellent properties of the imitation branches. Particles made from particle material that has a modulus of compression from about 0.1 to 100 MPa can be pressed through a die during the extrusion process together with a thermoplastic polymer in the coating composition. Because of the modulus of compression from about 0.1 to 100 MPa, the particles can pass the die even when only a relatively thin film of thermoplastic polymer is made. When the mixture then leaves the die, the particles expand and thus form a rough surface on the layer of thermoplastic polymer.

According to a preferred embodiment of the invention, the particles in the extrudable coating composition have a mean particle size $d_{90}$ from 0.01 to 50 mm, preferably from 0.05 to 30 mm, more preferred from 0.05 to 20 mm, even more preferred from 0.1 to 5 mm, and most preferred from 0.1 to 2 mm. Particles of this size are well suited to pass through typical dies for extrusion processes and simultaneously provide an excellent rough feel on the surface of the imitation branch. Particles with such a size stand out at the surface in such way as to provoke an excellent rough feel on the surface of the imitation branch that is very similar to the feel of a natural branch surface.

The $d_{90}$ value of the particles may for example be determined by determining the particle size distribution. The size at which 90 wt. % of the particles would pass a theoretical aperture of a sieve, as determined from the particle size distribution, is commonly referred to as the $d_{90}$ value. Different methods for the determination of the particle size distribution are known to the skilled person. The size distribution may for example be determined by analyzing the sizes of a particle sample under a microscope or on a photograph. The particle size distribution may also be determined by sieving experiments. For example, the particle size distribution may also be determined by laser diffraction, in particular according to ISO 13320:2009. In the determination of the particle size distribution by laser diffraction, the sample to be investigated may be suspended in a liquid medium, for example in ethanol, and the suspension may be subjected to an ultrasound treatment, for example for 120 seconds, followed by a pause, for example of 120 seconds. The suspension may also be stirred, for example at 70 rpm. The particle size distribution may then be determined by plotting the measurement results, in particular the cumulative sum of the percentage by mass of the particle sizes measured against the particle sizes measured. The $d_{90}$ value can then be determined from the particle size distribution. For the determination of the particle size distribution and/or the $d_{90}$ value of particles by laser diffraction, a particle size analyzer Helos available from the company Sympatec using the additional Sucell dispersing equipment may for example be employed.

The particle size distribution may also be determined by sieving experiments, in particular for particles that have a size of 0.1 mm or larger. For particles in this range the particle size distribution may be determined by sieving experiments. Preferably the sieving experiments are conducted according to ICS 19.120. Preferably, the particle size analysis is performed according to ICS 19.120. In case cork particles are used, the particle size analysis is preferably performed according to ISO 2030:1990.

Preferably, the particle size distribution is determined by sieving experiments. However, if the particle size distribution cannot be determined by sieving experiments for example because the $d_{90}$ of the particles is too small, the particle size distribution is preferably determined by laser diffraction.

The particles can also have different shapes, forms and/or structures. According to an embodiment of the invention, the particles can have spherical, rounded, irregular, angular, spongy, flaky, partly cylindrical or acicular and even partly cubic shape as well as mixtures of such shapes.

According to a preferred embodiment of the invention, the particles have a cellular structure. Cellular structures are made up from periodic or stochastic arrangements of open or closed cell types, with either two- or three-dimensional polyhedral layouts. Typical representatives of cellular structures are foams, fibers, wires, hollow spheres, alveolar structures and honeycomb structures.

Particles having a cellular structure are particularly well suited to compress during the extrusion process and subsequently expand in such way as to create the rough surface on the imitation branch.

The cellular structure of the particles can routinely be observed through scanning electron microscopy (SEM). The skilled person is aware of common apparatuses and techniques for observing a cellular structure within particles.

The particles are made from a particle material that has a modulus of compression from 0.1 to 100 MPa. According to a preferred embodiment of the invention, the particle material has a modulus of compression from 0.1 to 50 MPa, preferably from 1 to 30 MPa, more preferred from 1 to 20 MPa and even further preferred from 5 to 20 MPa. Particles made from a particle material with such a modulus of compression can pass even through narrow dies and expand subsequently to create an excellent rough surface in a coating on an article, in particular on an imitation branch. Particles from a particle material that has a higher modulus of compression may not easily pass through a die, in particular through a narrow die, during the manufacturing process. Particles from a particle material having a lower modulus of compression can pass through the die; however, they may compress too easily to provoke a rough feel on the surface of the coated article.

The modulus of compression describes the ratio of mechanical stress to strain in an elastic material when that material is being compressed. For anisotropic materials, the modulus of compression may differ depending on the orientation of the sample during the measurement. For example, as described in the article "Cork: properties, capabilities and application" by S. P. Silva et al. in the journal "International Materials Reviews", 2005, vol. 50, No. 6, pages 347 and 348 therein, the cellular structure in cork is anisotropic with respect to the radial direction on the one hand and the axial and tangential direction (also summarized as non-radial direction) on the other hand. This anisotropy of cork's cellular structure implies that its properties are anisotropic in these two directions. Thus, for anisotropic materials, the modulus of compression can be measured in different directions. For cork, the modulus of compression can be measured in radial (R) or non-radial (NR) direction.

Different methods for determining the modulus of compression of a particle material are known to the skilled person. The modulus of compression can, for example, be determined using a universal testing machine (UTM) such as, for example, Instron Model 1122. A sample of the material can be studied by cutting the material in a specific size, e.g. 30 mm×5 mm×60 mm, and placing the sample inside the universal testing machine. A specific crosshead speed of, for example, 1 to 8 mm/min can be applied onto the sample. Preferably, the modulus of compression is measured in a universal testing machine at a crosshead speed of 2 mm/min, corresponding to a strain rate of $0.002\ s^{-1}$, up to a strain of 80%. More preferably, the modulus of compression is measured according to ISO 844:2007. For cork samples, the modulus of compression is preferably measured according to ISO 7322:2014.

For an anisotropic particle material, the modulus of compression may be measured in different directions. Preferably, for an anisotropic particle material, the modulus of compression in at least one direction, most preferably in all directions, has to be within the limits stated above.

According to a preferred embodiment of the invention, the particles are made from a particle material that has a Young's modulus from 0.1 to 150 MPa, preferably 0.5 to 100 MPa, more preferred 1 to 50 MPa and most preferred 5 to 30 MPa. Such particles have proven to be excellent in compressing sufficiently within the die and also subsequently expanding when leaving the die.

Young's modulus defines the relationship between stress and strain in a material in the linear elasticity regime of a uniaxial deformation. The details concerning the modulus of compression for anisotropic materials explained above also apply for the Young's modulus of anisotropic materials. It can be measured in radial, axial and tangential direction.

Different methods for determining Young's modulus are known to the skilled person. Young's modulus can, for example, be determined using a universal testing machine such as, for example, Instron Model 1122. A sample of the material can be studied by cutting the material in a specific size, e.g. 30 mm×5 mm×60 mm, and placing the sample inside the universal testing machine. A specific crosshead speed of, for example, 1 to 8 mm/min can be applied onto the sample. Young's modulus can, for example, be calculated from the average slope of the stress-strain curve between the loads of 10 N and 100 N, corresponding to strains between approximately 1% and 2.5%. Preferably, the Young's modulus is determined in a tensile test in a universal testing machine by using a crosshead speed of 5 mm/min, corresponding to a strain rate of $0.0017\ s^{-1}$, and the Young's modulus is calculated from the average slope of the stress-strain curve between the loads of 10 N and 100 N, corresponding to strains between approximately 1% and 2.5%. The Young's modulus may be measured according to ISO 1926:2009. For cork samples, the modulus of compression is preferably measured according to ISO 7322:2014.

For an anisotropic particle material, the Young's modulus is measured in different directions. Preferably, for an anisotropic particle material, the Young's modulus in at least one direction, most preferably in all directions, has to be within the limits stated above. According to a preferred embodiment of the invention, the particles are made from a particle material that has a density, in particular a volumetric mass density, from 10 to 700 $kg/m^3$, preferably from 20 to 600 $kg/m^3$, more preferred from 30 to 500 $kg/m^3$, further preferred 40 to 400 $kg/m^3$, even more preferred 50 to 350 $kg/m^3$ and most preferred from 60 to 300 $kg/m^3$. For example, cork has a density, in particular a volumetric mass density, of 240 $kg/m^3$. Particles made from such a low-density particle material can be easily processed and are particularly suited for creating coatings on articles and/or coated articles, in particular imitation branches, having a natural look and feel.

The particles can furthermore be made from different particle materials. It is possible that the particles are made from just one specific material. It is also possible that the particles are made from a mixture of materials. According to a preferred embodiment of the invention, the particle material is selected from the group consisting of polyisoprene, foamed polyisoprene, polyurethane, foamed polyurethane, polyethylene, foamed polyethylene, polypropylene, foamed polypropylene, thermoplastic elastomers, foamed thermoplastic elastomers, cork-containing materials, cork, and mixtures thereof. Foamed materials particularly have a cellular structure. Preferably the particle material is a foamed material or a natural material with a foam-like structure. According to a particularly preferred embodiment, the particle material is selected from the group consisting of cork-containing material, cork, and natural materials with a foam-like structure, most preferred cork.

Thus, the invention preferably provides for an extrudable coating composition comprising a coating thermoplastic polymer and particles, wherein the particles are made from a particle material selected from the group consisting of polyisoprene, foamed polyisoprene, polyurethane, foamed polyurethane, polyethylene, foamed polyethylene, polypropylene, foamed polypropylene, thermoplastic elastomers, foamed thermoplastic elastomers, cork-containing materials, cork, and mixtures thereof, more preferably wherein the particles are made from a particle material selected from the group consisting of cork-containing material, cork, and natural materials with a foam-like structure, most preferred from cork. Materials of this type have shown to possess excellent elastic properties and to compress readily and effectively in the coating process. In particular cork particles show a good UV resistance and a good rotting resistance.

The coating thermoplastic polymer can, in general, be any extrudable thermoplastic polymer or mixture of thermoplastic polymers that can be used for coating the surface of an article. Good results have been obtained when the coating thermoplastic polymer is selected from the group consisting of polyolefins, polypropylene, polyethylene, low-density polyethylene, high-density polyethylene, polyvinyl chloride, polystyrene, ethylene vinyl acetate copolymer, acrylonitrile-butadiene-styrene, poly(butylene adipate-co-terephthalate), poly(butylene sebacate-co-terephthalate), polyhydroxyalkanoates, poly(butylene succinate), poly(styrene-butadiene-styrene), poly(styrene-ethylene-butylene-styrene), and mixtures thereof. According to a particularly preferred embodiment, the coating thermoplastic polymer is ethylene vinyl acetate copolymer, a mixture of ethylene vinyl acetate copolymer and poly(styrene-butadiene-styrene), a mixture of ethylene vinyl acetate copolymer and poly(styrene-ethylene-butylene-styrene), a mixture of polyethylene and poly(styrene-butadiene-styrene), a mixture of polyethylene and poly(styrene-ethylene-butylene-styrene), or a mixture of polyethylene and ethylene vinyl acetate copolymer.

The coating thermoplastic polymers named above have shown to be particularly suitable for coating of articles, in particular for the preparation of imitation branches. Furthermore, they show excellent compatibility with the particles during and after the extrusion process.

The coating thermoplastic polymers may be foamed. Preferably foaming of the coating thermoplastic polymer occurs during extrusion. Foaming of the coating thermoplastic polymer may be achieved for example by using a blowing agent such as a gas or expandable microspheres.

The extrudable coating composition according to the invention may also comprise one or more additives selected from the group consisting of organic fillers, inorganic fillers, UV-stabilizers, flame retardants, additives to influence the mechanical properties, additives to influence the flow behavior, additives to influence the foaming behavior, and pigments. The extrudable coating composition may also comprise further polymers.

The coating composition preferably comprises 5 to 60 wt. %, more preferably 10 to 50 wt. %, and even more preferably 20 to 40 wt. %, in each case based on the total weight of the coating composition, of the particles. The coating composition preferably comprises 40 to 95 wt. %, more preferably 50 to 90 wt. %, and even more preferably 50 to 80 wt. %, in each case based on the total weight of the coating composition, of the coating thermoplastic polymer. The extrudable coating composition may also be called coating composition.

The extrudable coating composition preferably comprises less than 20 wt. %, more preferably less than 10 wt. %, more preferably less than 5 wt. %, even more preferably less than 1 wt. %, and most preferably less than 0.5 wt. % water.

The extrudable coating composition is preferably processed in the form of a melt. The extrudable coating composition is preferably melt-processable, for example at a temperature of from 100° C. to 300° C., preferably from 120° C. to 250° C.

The invention is furthermore directed towards a coating on at least a part of the surface of an article, the coating comprising a coating thermoplastic polymer and particles wherein the particles are made from a particle material that has a modulus of compression from 0.1 to 100 MPa and wherein at least a part of the particles protrude from the surface of the coating.

According to an embodiment of the coating of the invention, the entire surface of the article is coated by the coating. In case the article is cut after preparation, the cutting face(s) are at least not entirely covered, in particular not covered.

According to a preferred embodiment of the invention, the coating is obtained by extrusion of a composition containing the coating thermoplastic polymer and the particles through a die with a gap wherein at least some of the particles in the composition have an equivalent sphere diameter that is larger than the gap of the die.

According to an embodiment of the coating of the invention, the extrudable coating composition according to the invention is used to form the coating according to the invention.

When at least some of the particles in the composition have an equivalent sphere diameter that is larger than the gap of the die, the resulting coating exhibits an excellent surface structure with a rough feel that is very similar to that of natural branches.

An equivalent sphere diameter of a non-spherical particle is the diameter of a sphere of equivalent volume as the non-spherical particle.

Different dies can be employed for the extrusion, for example a slot die or a cross-head die. Preferably, a cross-head die is employed. The dies may have gaps with different sizes. Preferably, the dies employed have a gap of 0.1 to 3 mm, more preferred 0.1 to 2 mm, even more preferred 0.5 to 1.5 mm, most preferred 1 mm. Preferably, a cross-head die with a 1 mm gap is employed.

According to another preferred embodiment of the coating according to the invention, the particles protruding from the surface of the coating each comprise at least one, in particular at least two, surface(s) that is substantially free from the coating thermoplastic polymer. Such a coating provides an excellent rough feel surface that promotes an authentic appearance of the coated article, in particular the imitation branch.

All the details described with regards to the coating thermoplastic polymer in context to the extrudable coating composition according to the invention also apply for the coating thermoplastic polymer of the coating according to the invention.

All the details described with regards to the particles in context to the inventive extrudable coating composition also apply for the particles of the inventive coating.

All the details described with regards to the particle material in context to the inventive extrudable coating composition also apply for the particle material of the inventive coating.

The coating according to the invention may also comprise one or more additives selected from the group consisting of organic fillers, inorganic fillers, UV-stabilizers, flame retardants, additives to influence the mechanical properties, additives to influence the flow behavior, additives to influence the foaming behavior, and pigments. The coating may also comprise further polymers.

Different ways of applying the inventive coating on at least a part of the surface of an article are possible. The coating may be applied to the surface of the article by coextrusion. When the coating is applied to the surface of the article by coextrusion, the coating is particularly well bound onto the surface of the article. According to a preferred embodiment of the invention, the coating is applied to the surface of the article by post-coextrusion. In particular, the coating can be applied by cross-head extrusion. When the coating is applied on at least part of the surface of an article by post-coextrusion or by cross-head extrusion, coated articles comprising a foamed article core are easier to prepare because the coating thermoplastic polymer is not stretched as strongly compared to the preparation in a coextrusion process. Moreover, the use of post-coextrusion or cross-head extrusion provides a greater choice of coating thermoplastic polymers, allows for the use of recycled material, and is more tolerant to impurities. Further, the use of post-coextrusion or cross-head extrusion allow to prepare the article to be coated at a preparation speed that differs from the coating speed and/or to obtain the article to be coated from a different manufacturer.

The invention is furthermore directed towards a coated article comprising an article surface and a coating over at least a part of the article surface, the coating comprising a coating thermoplastic polymer and particles wherein the particles are made from a particle material that has a modulus of compression from 0.1 to 100 MPa and wherein at least a part of the particles protrude from the surface of the coating.

All the details described with regards to the coating thermoplastic polymer in context to the extrudable coating composition according to the invention also apply for the coating thermoplastic polymer of the coated article according to the invention.

All the details described with regards to the particles in context to the extrudable coating composition according to the invention also apply for the particles of the coated article according to the invention.

All the details described with regards to the particle material in context to the extrudable coating composition according to the invention also apply for the particle material of the coated article according to the invention.

All the details described with regards to the coating according to the invention also apply for the coating of the coated article according to the invention.

The coating may be applied to the article surface by coextrusion or by post-coextrusion, in particular by cross-head extrusion. Preferably, the coating is applied to the article by post-coextrusion, in particular by cross-head extrusion.

According to a preferred embodiment of the invention, the article of the coated article according to the invention comprises an article thermoplastic polymer. This results in a good adhesion of the coating according to the invention on the article surface. Articles comprising an article thermoplastic polymer exhibit a high compatibility with the coating according to the invention and thus result in coated articles with a high durability and high scratch resistance.

According to a particularly preferred embodiment of the invention, the article thermoplastic polymer is foamed. The article thermoplastic polymer being foamed saves material and provides for a light-weight coated article. Moreover, a coated article comprising a foamed article thermoplastic polymer has properties and features similar to natural branches. Thus, a coated article comprising an article thermoplastic polymer being foamed is exceptionally suitable for imitation branches.

It is furthermore preferred that the article thermoplastic polymer is selected from the group consisting of polyolefins, polypropylene, polyethylene, low-density polyethylene, high-density polyethylene, polyvinyl chloride, polystyrene, ethylene vinyl acetate copolymer, acrylonitrile-butadiene-styrene, poly(butylene adipate-co-terephthalate), poly(butylene sebacate-co-terephthalate), polyhydroxyalkanoates, poly(butylene succinate), poly(styrene-butadiene-styrene), poly(styrene-ethylene-butylene-styrene), poly(lactic acid), and mixtures thereof. Studies have shown that these polymers are well suited for the coated articles according to the invention due to their mechanical and physical properties.

The coated article according to the invention can comprise an article of varying structures, forms and shapes. It has been found that the coating according to the invention adheres extremely well to various articles, providing the possibility of obtaining an exceptionally broad range of structures, forms and shapes of coated articles. The articles can be solid or hollow. According to a preferred embodiment of the invention, the article is a sheet, a moulded part, or a plastic strand. The article may have a rectangular, a round or an irregular shape. These articles allow for the production of a broad range of products.

The invention is also directed towards an imitation branch comprising a plastic strand and a coating over at least a part of the outer surface of the plastic strand, the plastic strand comprising a strand thermoplastic polymer and the coating comprising a coating thermoplastic polymer and particles wherein the particles are made from a particle material that has a modulus of compression from 0.1 to 100 MPa and that at least a part of the particles protrude from the surface of the coating.

All the details described with regards to the coating thermoplastic polymer in context to the extrudable coating composition according to the invention also apply for the coating thermoplastic polymer of the imitation branch according to the invention.

All the details described with regards to the particles in context to the extrudable coating composition according to the invention also apply for the particles of the imitation branch according to the invention.

All the details described with regards to the particle material in context to the extrudable coating composition according to the invention also apply for the particle material of the imitation branch according to the invention.

All the details described with regards to the coating according to the invention also apply for the coating of the imitation branch according to the invention.

According to an embodiment of the invention, the imitation branch is hollow inside. According to another embodiment of the invention, the imitation branch is solid inside. According to a preferred embodiment of the invention, the imitation branch is foamed inside. The imitation branch may also be a mixture of hollow, solid, and foamed inside, in particular when the imitation branch is not perfectly foamed.

According to a preferred embodiment of the invention, the coating is applied to the plastic strand by coextrusion or by post-coextrusion in particular by cross-head extrusion.

Preferably, the coating is applied to the article by post-coextrusion, in particular by cross-head extrusion.

According to a preferred embodiment of the invention, the strand thermoplastic polymer is foamed. The strand thermoplastic polymer being foamed provides for a light coated plastic strand with properties and features similar to natural branches.

According to another preferred embodiment of the invention, the strand thermoplastic polymer is selected from the group consisting of polyolefins, polypropylene, polyethylene, low-density polyethylene, high-density polyethylene, polyvinyl chloride, polystyrene, ethylene vinyl acetate copolymer, acrylonitrile-butadiene-styrene, poly(butylene adipate-co-terephthalate), poly(butylene sebacate-co-terephthalate), polyhydroxyalkanoates, poly(butylene succinate), poly(styrene-butadiene-styrene), poly(styrene-ethylene-butylene-styrene), poly(lactic acid), and mixtures thereof. Studies have shown that these polymers are well suited for imitation branches due to their mechanical and physical properties.

The invention is furthermore directed towards a method for coating an article, comprising the steps of
  a. providing an article comprising an article surface,
  b. providing an extrudable coating composition comprising a coating thermoplastic polymer and particles,
  c. extruding the coating composition onto the article surface thereby forming a coating on at least a part of the article surface, thereby forming a coated article,
wherein the particles are made from a particle material that has a modulus of compression from 0.1 to 100 MPa and wherein at least a part of the particles protrude from the surface of the coating.

It is a preferred embodiment of the method according to the invention that the coating composition is extruded using a die with a gap, wherein at least some of the particles in the coating composition have an equivalent sphere diameter that is larger than the gap of die.

Different dies can be employed for the extrusion, for example a slot die or a cross-head die. Preferably, a cross-head die is employed. The dies may have gaps with different sizes. Preferably, the dies employed have a gap of 0.1 to 3 mm, more preferred 0.1 to 2 mm, even more preferred 0.5 to 1.5 mm, most preferred 1 mm. Preferably, a cross-head die with a 1 mm gap is employed.

All the details described with regards to the coating thermoplastic polymer in context to the extrudable coating composition according to the invention also apply for the coating thermoplastic polymer of the method according to the invention.

All the details described with regards to the particles in context to the extrudable coating composition according to the invention also apply for the particles of the method according to the invention.

All the details described with regards to the particle material in context to the extrudable coating composition according to the invention also apply for the particle material of the method according to the invention.

All the details described with regards to the coating according to the invention also apply for the coating of the method according to the invention.

According to another preferred embodiment of the inventive method, the coating is extruded onto the article surface using a cross-head extruder. A cross-head extruder is particularly useful for the extrusion of the coating onto the article surface, when the article is already at least partly, preferably fully, expanded when the coating is applied in the cross-head. In this way, a leaner, faster and simpler production method can be achieved.

According to a further preferred embodiment of the inventive method, the coated article obtained in method step c. has a substantially round cross-section perpendicular to the center line of the article.

It is also possible to add a post-extrusion treatment to the coating method for the preparation of a coated article. For example, the coated article obtained in step c. can be subjected to a cooling step in which the coated article can be further drawn through a moving cooling medium, in which the coated article is completely submerged in said cooling medium for at least part of its path through the cooling medium, and in which during cooling, air and/or nitrogen bubbles are provided on at least a part of the outer surface of the coated article as described in EP 2 301 763.

The invention is further directed towards a coated article, in particular an imitation branch, obtainable by the method according to the invention. According to a preferred embodiment of the invention, the coated article, in particular the imitation branch, is obtained by the method according to the invention.

Another aspect of the invention is a wall panel comprising at least one imitation branch according to the invention. Wall panels comprising the imitation branch according to the invention are exceptionally durable in all weather conditions, have a natural and aesthetic look, and are furthermore light and easily transportable.

Another aspect of the invention is the use of particles in a coating composition for the coating of articles, wherein the particles are made from a particle material that has a compression modulus of 0.1 to 100 MPa.

Preferably, the particles are used to create an aesthetically pleasing natural look on the coated article.

The particles being made from a particle material that has a compression modulus of 0.1 to 100 MPa have been found to be broadly applicable in coating compositions for the coating of articles. Their ability to create particular surface patterns on any type of material makes this a variable and cheap method of coating.

According to a preferred embodiment of the use according to the invention, the articles are coated by extrusion. This preferred embodiment takes especially advantage of the compression modulus of the particles which can be pressed through the die during extrusion and subsequently expand to create a particular surface pattern on the article.

All the details described with regards to the coating thermoplastic polymer in context to the extrudable coating composition according to the invention also apply for the coating thermoplastic polymer of the use according to the invention.

All the details described with regards to the particles in context to the extrudable coating composition according to the invention also apply for the particles of the use according to the invention.

All the details described with regards to the particle material in context to the extrudable coating composition according to the invention also apply for the particle material of the use according to the invention.

All the details described with regards to the coating according to the invention also apply for the coating of the use according to the invention.

Figure 2:
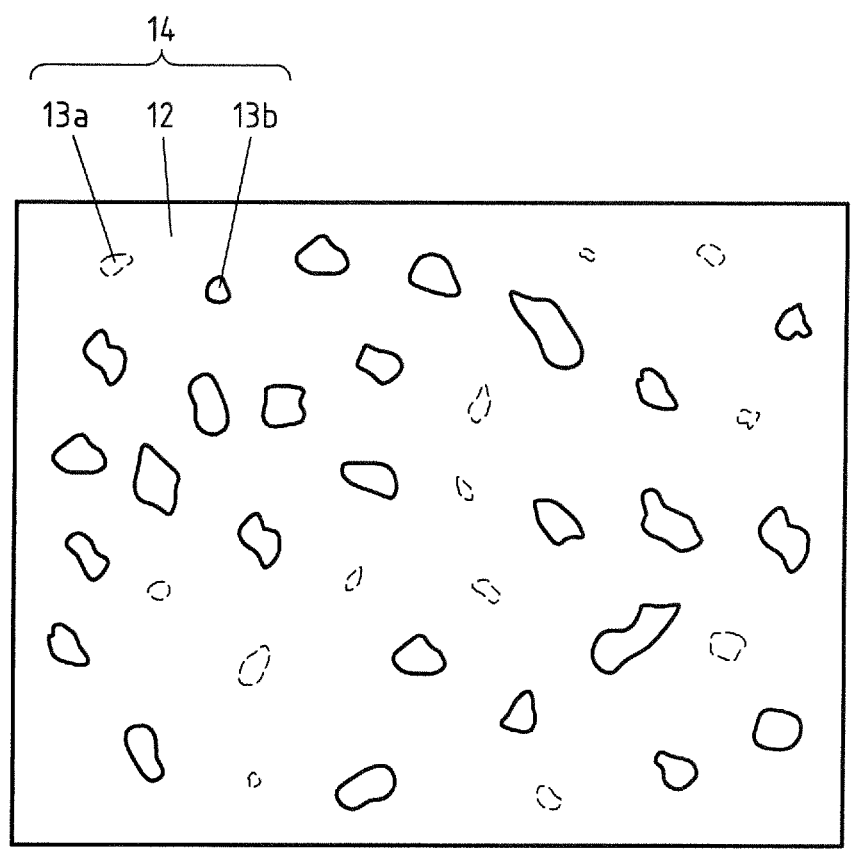
FIG. 2 shows an exemplary section of a coating displaying a coating thermoplastic polymer and a particles protruding from the surface.

The invention will be further illustrated by the FIGS. 1 to 2 which, however, do not limit the scope of the invention.

FIG. 1 shows a cross-section of an imitation branch 10 as a specific example of a coated article 10. The imitation branch 10 comprises a plastic strand 11 containing a foamed thermoplastic polymer as the article thermoplastic polymer. The foamed thermoplastic polymer is preferably foamed polyethylene. The imitation branch 10 further comprises a coating 14 that contains a coating thermoplastic polymer 12 which is preferably polyethylene. The coating 14 further contains particles 13a and 13b. The particles 13a and 13b are from a particle material with a modulus of compression from 1 to 20 MPa. Preferably, the particle material is cork, but other particle materials, such as foamed polyurethane with a density of from 160 kg/m$^3$ to 390 kg/m$^3$, can also be used.

The coating 14 is preferably applied by extruding an extrudable coating mixture on the surface of plastic strand 11 by cross-head extrusion. The extrudable coating mixture preferably contains a coating thermoplastic polymer 12, preferably polyethylene, and particles 13a and 13b. The particles 13a and 13b are preferably from a particle material with a modulus of compression from 1 to 20 MPa. Preferably, the particle material is cork, but other particle materials, such as foamed polyurethane with a density of from 160 kg/m$^3$ to 390 kg/m$^3$, can also be used.

At least some of the particles 13a and 13b preferably have an equivalent sphere diameter that is larger than the gap of the cross-head extrusion die. Preferably, a 1 mm gap is used. The particles 13a and 13b preferably have a $d_{90}$ of from 0.1 to 5 mm, more preferably from 0.1 to 2 mm. In this way, at least a part of the particles 13a and 13b is compressed when passing the gap of the die. In the coating 14 on plastic strand 11, the compressed particles 13a and 13b bounce back to their uncompressed size immediately after being applied to the surface of plastic strand 11. In this way, at least some of the particles, denoted in FIGS. 1 and 2 as 13b, protrude from the surface of coating 14. The particles 13b that protrude from the surface of coating 14 preferably comprise at least one surface that is substantially free from the coating thermoplastic polymer 12.

FIG. 2 shows a section of the surface of coating 14 of the imitation branch 10 comprising coating thermoplastic polymer 12 and particles 13b protruding from the surface of coating 14. As can be seen from FIG. 2, particles 13b comprise at least one surface that is substantially free from coating thermoplastic polymer 12.

The invention claimed is:

1. A coated article comprising an article, an article surface, and a coating adhered to at least a part of the article surface, the coating comprising a coating thermoplastic polymer and particles, wherein the particles are made from a particle material that has a modulus of compression from 0.1 to 100 MPa and that at least a part of the particles protrude from the surface of the coating, wherein the article comprises at least one of the following: a sheet, a moulded part, a plastic strand, or any combination thereof.

2. The coated article according to claim 1, wherein the coating is obtained by extrusion of a composition containing the coating thermoplastic polymer and the particles through a die with a gap, wherein at least some of the particles have an equivalent sphere diameter that is larger than the gap of the die, and/or that the particles protruding from the surface of the coating each comprises at least one surface(s) that is substantially free from the coating thermoplastic polymer; and/or that the coating thermoplastic polymer is selected from the group consisting of polyolefins, polypropylene, polyethylene, low-density polyethylene, high-density polyethylene, polyvinyl chloride, polystyrene, ethylene vinyl acetate copolymer, acrylonitrile-butadiene-styrene, poly (butylene adipate-co-terephthalate), poly (butylene sebacate-co-terephthalate), polyhydroxyalkanoates, poly (butylene succinate), poly (styrene-butadiene-styrene), poly (styrene-ethylene-butylene-styrene), and mixtures thereof.

3. The coated article according to claim 1, wherein the article is solid, hollow or a mixture thereof and/or that the coating is applied to the article surface by post-coextrusion and/or that the article comprises an article thermoplastic polymer, that is selected from the group consisting of polyolefins, polypropylene, polyethylene, low-density polyethylene, high-density polyethylene, polyvinyl chloride, polystyrene, ethylene vinyl acetate copolymer, acrylonitrile-butadiene-styrene, poly (butylene adipate-co-terephthalate), poly (butylene sebacate-co-terephthalate), polyhydroxyalkanoates, poly (butylene succinate), poly (styrene-butadiene-styrene), poly (styrene-ethylene-butylene-styrene), poly (lactic acid), and mixtures thereof.

4. A method for coating an article, comprising the steps of
   a. providing an article comprising an article surface, wherein the article comprises at least one of the following: a sheet, a moulded part, a plastic strand, or any combination thereof,
   b. providing an extrudable coating composition comprising a coating thermoplastic polymer and particles,
   c. extruding the coating composition onto the article surface thereby forming a coating adhered to at least a part of the article surface, thereby forming a coated article, wherein
      the particles are made from a particle material that has a modulus of compression from 0.1 to 100 MPa and that at least a part of the particles protrude from the surface of the coating.

5. The method according to claim 4, wherein the coating composition is extruded using a die with a gap, wherein at least some of the particles in the coating composition have an equivalent sphere diameter that is larger than the gap of the die and/or that the coating composition is extruded onto the article surface using an extruder with a cross-head die and/or that the coated article obtained in method step c. has a substantially round cross-section perpendicular to the center line of the article.

6. The method according to claim 4, wherein the particles and/or that the coating thermoplastic polymer is selected from the group consisting of polyolefins, polypropylene, polyethylene, low-density polyethylene, high-density polyethylene, polyvinyl chloride, polystyrene, ethylene vinyl acetate copolymer, acrylonitrile-butadiene-styrene, poly (butylene adipate-co-terephthalate), poly (butylene sebacate-co-terephthalate), polyhydroxyalkanoates, poly (butylene succinate), poly (styrene-butadiene-styrene), poly (styrene-ethylene-butylene-styrene), and mixtures thereof.

7. The coated article obtainable by a method according to claim 4.

* * * * *